(12) United States Patent
Balko et al.

(10) Patent No.: US 8,745,635 B2
(45) Date of Patent: Jun. 3, 2014

(54) MANAGING BUSINESS PROCESS MESSAGING

(75) Inventors: Soeren Balko, Indooroophilly (AU); Harald Schubert, Walldorf (DE)

(73) Assignee: SAP AG, Walldorf (DE)

( * ) Notice: Subject to any disclaimer, the term of this patent is extended or adjusted under 35 U.S.C. 154(b) by 57 days.

(21) Appl. No.: 13/454,366

(22) Filed: Apr. 24, 2012

(65) Prior Publication Data
US 2013/0283291 A1 Oct. 24, 2013

(51) Int. Cl.
*G06F 9/44* (2006.01)
*G06Q 30/00* (2012.01)

(52) U.S. Cl.
USPC ........................................ 719/313; 705/14.23

(58) Field of Classification Search
None
See application file for complete search history.

(56) References Cited

U.S. PATENT DOCUMENTS

| | | | |
|---|---|---|---|
| 7,523,447 B1 * | 4/2009 | Callahan et al. | 717/135 |
| 8,046,383 B2 | 10/2011 | Weber et al. | |
| 8,091,043 B2 | 1/2012 | Schubert et al. | |
| 2003/0041071 A1 * | 2/2003 | Wakai et al. | 707/103 X |
| 2005/0198393 A1 * | 9/2005 | Stutz et al. | 709/246 |
| 2009/0165021 A1 * | 6/2009 | Pinkston et al. | 719/314 |
| 2010/0005472 A1 * | 1/2010 | Krishnaraj et al. | 718/104 |

OTHER PUBLICATIONS

"Process Integration (PI)", from http://help.sap.com/saphelp_nw04s/helpdata/en/5f/555a421b5ec153e10000000a1550b0/frameset.htm, last visited Mar. 21, 2012 (3 pages).

"MQSeries Primer," IBM MQSeries EAI Center, Oct. 1999, from http://www.redbooks.ibm.com/redpapers/pdfs/redp0021.pdf, last visited Mar. 21, 2012 (34 pages).

"Microsoft BizTalk Server," from http://en.wikipedia.org/wiki/Microsoft_BizTalk_Server, last visited Mar. 21, 2012 (3 pages).

Qusay H. Mahmoud, "Getting Started with Java Messaging Service (JMS)," Nov. 2004, from http://java.sun.com/developer/technicalArticles/Ecommerce/jms/, last visited Mar. 21, 2012 (9 pages).

Dr. Sören Balko et al., "Framework for Ad-Hoc Process Flexibility" U.S. Appl. No. 12/848,679, filed Aug. 2, 2010.

Dr. Sören Balko, "High-Load Business Process Scalability" U.S. Appl. No. 13/094,366, filed Apr. 26, 2011.

Boris Klinker et al., "Systems and Methods for Business Process Logging" U.S. Appl. No. 13/102,837, filed May 6, 2011.

Dr. Sören Balko, "Silent Migration of Business Process Binaries" U.S. Appl. No. 13/206,960, filed Aug. 10, 2011.

Dr. Sören Balko, "Transaction Load Reduction for Process Completion" U.S. Appl. No. 13/289,606, filed Nov. 4, 2011.

* cited by examiner

Primary Examiner — Charles E Anya
(74) Attorney, Agent, or Firm — Fish & Richardson P.C.

(57) ABSTRACT

Systems, methods, apparatus, and computer-readable media for managing business process messaging include receiving a business process message at a first node of multiple nodes in a distributed computing environment, the business process message comprising a message payload; correlating the business process message with a business process executing on one or more of the plurality of nodes in the distributed computing environment based on the message payload; identifying the one or more of the plurality of nodes in the distributed computing environment; providing the business process message to the identified one or more of the plurality of nodes; and mapping the message payload to the business process executing on the identified one or more of the plurality of nodes.

18 Claims, 4 Drawing Sheets

MANAGING BUSINESS PROCESS MESSAGING

TECHNICAL BACKGROUND

This disclosure relates to managing business process messaging.

BACKGROUND

Business processes may represent complex repetitive real-world procedures, orchestrating both automated and manual steps. While doing so, business processes regularly need to synchronize their progress to other entities, such as other software components, physical devices, or human users. That may include receiving messages (e.g., events, signals) from those entities and blocking the process until a message is received. Messages may be required to adhere to a correlation condition, which compares fields from the message payload to the process context. In this way, a single message may not be received by any process, may be routed to a single process, or may even be broadcast to multiple processes.

Reliability and consistency may be a concern in receiving messages from within business processes. Indeed, such processes govern the core business of an organization, having a significant financial impact and often being constrained by contractual agreements with business partners or even being subject to auditing. In some instances, a matching message must be received by a process once and only once. "Exactly once" message delivery is particularly challenging in distributed environments where, for scalability and failover reasons a business process management suite (BPMS) runtime is installed on multiple computer nodes. Such a distributed BPMS infrastructure may be provided by a traditional cluster setup that shares some central components (e.g., a database, a locking server, and other components) or a cloud-based "platform as a service" installation, where elasticity (i.e., dynamic growth or reduction of computing resources based on the workload) may be a key characteristic.

SUMMARY

This disclosure describes general embodiments of systems, methods, apparatus, and computer-readable media for managing business process messaging by receiving a business process message at a first node of multiple nodes in a distributed computing environment, the business process message including a message payload; correlating the business process message with a business process executing on one or more of the plurality of nodes in the distributed computing environment based on the message payload; identifying the one or more of the plurality of nodes in the distributed computing environment; providing the business process message to the identified one or more of the plurality of nodes; and mapping the message payload to the business process executing on the identified one or more of the plurality of nodes.

In a first aspect combinable with any of the general embodiments, providing the business process message and mapping the message payload occur asynchronously.

In a second aspect combinable with any of the previous aspects, identifying the one or more of the plurality of nodes in the distributed computing environment includes identifying one node of the plurality of nodes in the distributed computing environment on which the business process is executing; and determining that the identified one node and the first node are the same node.

In a third aspect combinable with any of the previous aspects, providing the business process message to the identified one or more of the plurality of nodes includes directly associating the business process message to the business process executing on the identified one node.

In a fourth aspect combinable with any of the previous aspects, identifying the one or more of the plurality of nodes in the distributed computing environment includes determining that the business process is executing on one or more nodes other than the first node in the plurality of nodes; constructing a script including the message payload; and publishing the script to a queue available to the plurality of nodes.

A fifth aspect combinable with any of the previous aspects includes running, on the one or more nodes other than the first node in the plurality of nodes, the script from the queue.

In a sixth aspect combinable with any of the previous aspects, mapping the message payload to the business process executing on the identified one or more of the plurality of nodes includes, subsequent to running the script, mapping the message payload to the business process executing on the one or more nodes other than the first node.

A seventh aspect combinable with any of the previous aspects includes constructing a second script including the message payload; determining that the business process has terminated prior to mapping the message payload to the business process executing on the identified one or more of the plurality of nodes; based on the determination, logging the second script for subsequent presentation to a user.

In an eighth aspect combinable with any of the previous aspects, providing the business process message to the identified one or more of the plurality of nodes includes creating one or more proxy objects associated with the business process executing on one or more of the plurality of nodes; creating a matching business process message for each of the one or more proxy objects; and providing the matching business process message to the one or more of the plurality of nodes.

Various embodiments of a message delivery middleware in accordance with the present disclosure may include one, some, or all of the following features. For example, a message delivery middleware may successfully deliver messages independently of a current status (e.g., an "idle status") of a message receiving process. As another example, a message delivery middleware may scale with available computing resources (e.g., a number of computer nodes) by minimizing the transport of receiving processes across nodes. As yet another example, a message delivery middleware may decouple message receipt by multiple matching processes (e.g., broadcast). Further, a message delivery middleware may significantly improve message throughput in a distributed infrastructure while providing (or improving on) the same functional features as conventional correlation mechanisms (e.g., exactly once message delivery with conditional process start, correlation conditions based on equality checks between keys extracted from the message payload and the process context, message broadcast to multiple matching processes, and other features).

Various embodiments of a message delivery middleware in accordance with the present disclosure may include one, some, or all of the following features. For example, a message delivery middleware may provide for improved scale-out characteristics, thereby enabling more messages to be received when further computing resources (e.g., additional application server instances on new cluster nodes) are added. For example, a message delivery middleware may make process instances "sticky" to a cluster node (i.e., avoiding relocations to other cluster nodes) and avoid "thrashing" situations that would arise from "round-robined" messages, thereby causing successive process-relocations across the cluster. A message delivery middleware may also simplify an approach to "message correlation" by strictly adhering to a separation of concerns principle. For example, message correlation may no longer rely on the cluster protocol but may purely be performed on the database by using a queuing infrastructure, which is optimized for reliably transporting messages across the cluster. As another example, a message delivery middleware may help make individual BPMS runtime instances (i.e., "kernels") self-contained in a sense that they do not need to be cluster aware for message correlation. As yet another example, a message delivery middleware may be applicable to use-cases beyond message correlation, such as, for example, any BPM scenario processing inbound events that are received from other applications or processes. For example, a message delivery middleware may facilitate the de-coupling of user tasks from their hosting process instances; asynchronously receiving timer events; and processing administrative actions such as process cancellation, suspension, and resumption, to name a few examples. In such additional use-cases, a message delivery middleware may provide for the same simplification, scalability and functional completeness as for message correlation.

These general and specific aspects can be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

Figure 1:
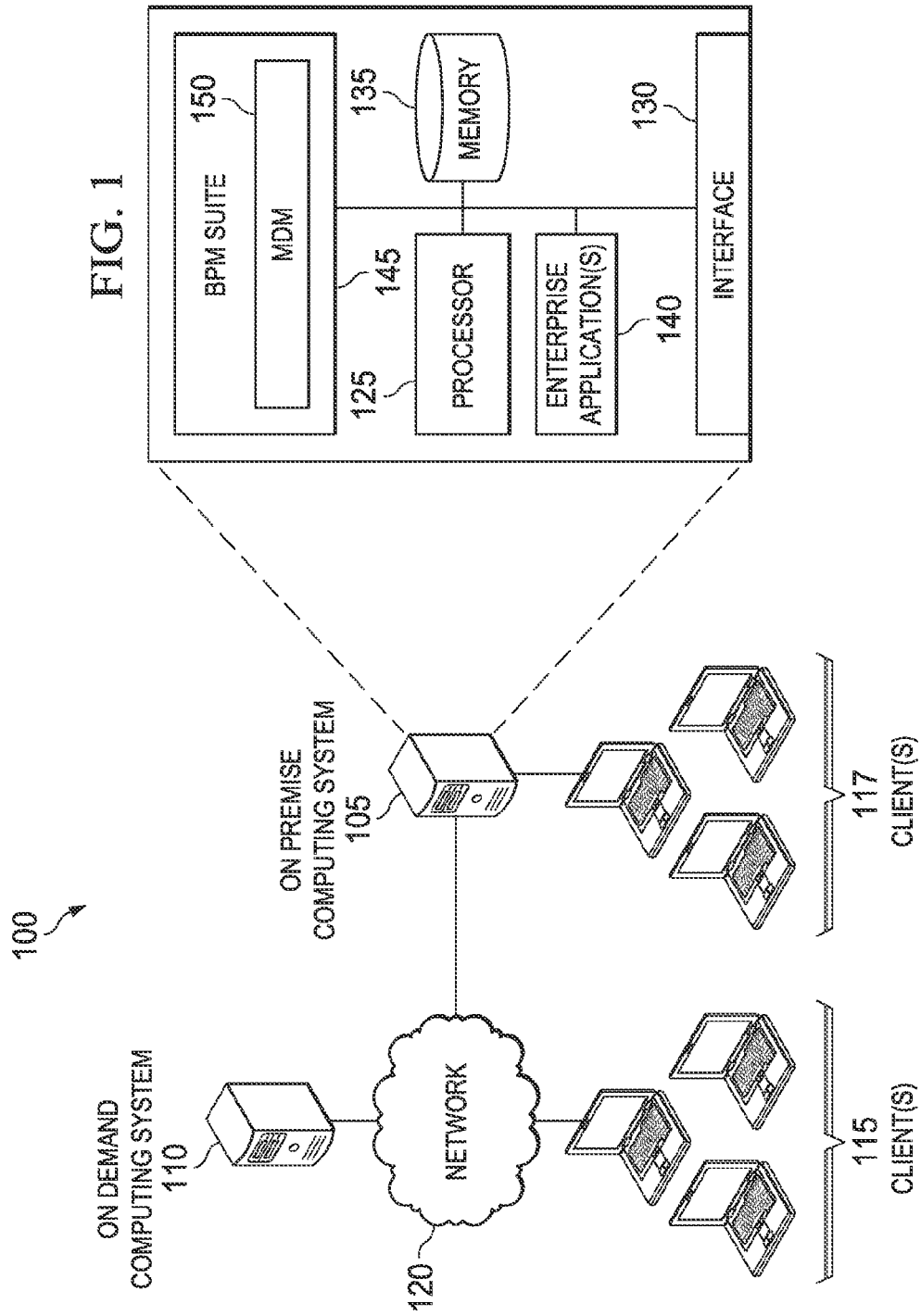
FIG. 1 illustrates an example distributed computing system including a business process management suite (BPMS) runtime that includes a message delivery middleware.

FIG. 1 illustrates an example distributed computing system 100 including a business process management suite (BPMS) runtime 145 having a message delivery middleware (MDM) 150. As illustrated, the system 100 includes an on-demand computing system 110, an on-premise computing system 105 communicably coupled to one or more clients 117, and one or more clients 115 communicably coupled through a network 120. In alternative embodiments, however, one or more of these components may not be part of the distributed computing system 100 without departing from the scope of the present disclosure. For instance, in some embodiments, the on-demand computing system 110 may not be included in the system 100, and logic (e.g., software, middleware, source code, executable instructions, data, and otherwise) illustrated as residing on the on-demand computing system 110 may be located on, for example, the on-premise computing system 105 or another computing system communicably coupled through the network 120. In any event, the illustrated system 100 may have alternative embodiments where various components (e.g., servers, databases, software modules, and otherwise) are not present or reside in or on different appliances than shown in FIG. 1.

Each of the on-demand computing system 110 and on-premise computing system 105 includes one or more server appliances having a processor and an interface. For example, the illustrated on-premise computing system 105 includes a processor (or processors) 125 and an interface (or interfaces) 130. As further illustrated, the on-premise computing system 105 includes the BPMS runtime 145 including the MDM 150. At a high level, the MDM 150 may implement one or more methods that facilitate the provision of one or more messages (e.g., business process messages) received at a particular node (e.g., client) of a distributed computing system to one or more other nodes (e.g., clients) within the distributed computing system that are executing business processes related to the one or more messages. The MDM 150 may, in some embodiments, refrain from ever transporting one of the business processes to the particular node where the message was delivered. Instead, the MDM 150 may asynchronously separate message correlation into, for example, multiple (e.g., three) stages that are implemented in different transactions. More details regarding the operation of the MPM 150 are provided below and in the accompanying figures.

In general, the on-demand computing system 110 and on-premise computing system 105 may each be one or more servers that store applications, software, middleware, and data, for example, the BPMS runtime 145, one or more enterprise applications 150, and any hosted applications located on the on-demand computing system 110. In some instances, the on-demand computing system 110 and on-premise computing system 105 may each store multiple various applications. In some instances, the on-demand computing system 110 and on-premise computing system 105 may each include a web server, where the BPMS runtime 145 (including the MDM 150), the applications 145, and any other applications represent one or more web-based applications accessed and executed via network 120 by the clients 117, the clients 115, or other clients of the system 100 to perform the programmed tasks or operations of the BPMS runtime 145.

At a high level, the on-demand computing system 110 and on-premise computing system 105 each represents an electronic computing device operable to receive, transmit, process, store, or manage data and information associated with the system 100. For example, the on-premise computing system 105 may be responsible for receiving application requests from one or more client applications associated with the clients 115 of system 100 (e.g., enterprise clients or other clients) and responding to the received requests by processing said requests with the BPMS runtime 145 with the MDM 150, enterprise applications 150, and/or other applications, and sending the appropriate response back to the requesting clients 115 illustrated in FIG. 1. Requests associated with the BPMS runtime 145 and/or other applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server associated with the on-demand computing system 110 and a single server associated with the on-premise computing system 105, system 100 can be implemented using two or more servers at each of the on-demand computing system 110 and the on-premise computing system 105, as well as computers other than servers, including a server pool communicably coupled to multiple nodes (e.g., clients). Indeed, on-demand computing system 110 and on-premise computing system 105 may each be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated on-demand computing system 110 and on-premise computing system 105 may each be adapted to execute any operating system, including Linux, UNIX, Windows, Mac OS, or any other suitable operating system.

At a high level, each of the BPMS runtime 145 and MDM 150 is any application, program, module, process, or other software that may execute, change, delete, generate, or otherwise manage information according to the present disclosure, particularly in response to and in connection with one or more requests received from the illustrated clients 115 and their associated client applications. In certain cases, system 100 may implement a composite BPMS runtime 145 and/or MDM 150. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, each of the BPMS runtime 145 and MDM 150 may represent web-based applications accessed and executed by remote clients or client applications via the network 120 (e.g., through the Internet). Further, while illustrated as internal to the on-premise computing system 105, one or more processes associated with the BPMS runtime 145 and/or MDM 150 may be stored, referenced, or executed remotely. For example, a portion of the BPMS runtime 145 and/or MDM 150 may be a web service associated with the application that is remotely called, while another portion of the BPMS runtime 145 and/or MDM 150 may be an interface object or agent bundled for processing at a remote client. Moreover, any or all of the BPMS runtime 145 and/or MDM 150 may be a child or sub-module of another software module or enterprise application (not illustrated) without departing from the scope of this disclosure. Still further, portions of the BPMS runtime 145 and/or MDM 150 may be executed by a user working directly at the on-premise computing system 105 as well as remotely.

The illustrated interface 130 (and other interfaces, not shown) may be used by the on-premise computing system 105 for communicating with other systems in a client-server or other distributed environment (including within system 100) connected to the network 120 (e.g., clients 115 as well as other systems communicably coupled to the network 120). Generally, the interface 130 includes logic encoded in software and/or hardware in a suitable combination and operable to communicate with the network 120. More specifically, the interface 130 may include software supporting one or more communication protocols associated with communications such that the network 120 or interface's hardware is operable to communicate physical signals within and outside of the illustrated system 100.

The on-demand computing system 110 and the on-premise computing system 105 each includes a processor or multiple processors. The on-premise computing system 105, as illustrated, include the processor 125. Although illustrated as a single processor 125 in FIG. 1, two or more processors may be used according to particular needs, desires, or particular embodiments of system 100. Each processor 125 may be a central processing unit (CPU), a blade, an application specific integrated circuit (ASIC), a field-programmable gate array (FPGA), or another suitable component. Generally, the processor 125 executes instructions and manipulates data to perform the operations of the respective on-demand computing system 110 or on-premise computing system 105 and, specifically, the BPMS runtime 145 with the MDM 150, applications 145, and other applications. Specifically, the processor 125 executes the functionality required to receive and respond to requests from the clients 117 and/or the clients 115 and their respective client applications, as well as the functionality required to perform the other operations of the BPMS runtime 145 with the MDM 150.

Regardless of the particular implementation, "software" may include computer-readable instructions, firmware, wired or programmed hardware, or any combination thereof on a tangible, non-transitory (or in some instance transitory) medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system 100, for example, the processor 125 executes the respective portion (all are a part) of the applications on the on-premise computing system 105.

Generally, the network 120 facilitates wireless or wireline communications between the components of the system 100 (i.e., between the on-demand computing system 110 and on-premise computing system 105 and the clients 115 and/or clients 117), as well as with any other local or remote computer, such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the clients 115 and/or the clients 117 and the on-demand computing system 110 and the on-premise computing system 105. Further, all or a portion of the network 120 can include either a wireline or wireless link. Example wireless links may include 802.11a/b/g/n, 802.20, WiMax, and/or any other appropriate wireless link. In other words, the network 120 encompasses any internal or external network, networks, subnetwork, or combination thereof operable to facilitate communications between various computing components inside and outside the illustrated system 100.

The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

As illustrated, the on-premise computing system 105 includes memory 135. Memory 135 may include any memory or database module and may take the form of volatile or non-volatile memory including, without limitation, magnetic media, optical media, random access memory (RAM), read-only memory (ROM), removable media, or any other suitable local or remote memory component. Memory 135 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the on-premise computing system 105 and its one or more enterprise applications 140. Additionally, memory 135 may include any other appropriate data, such as VPN applications, firmware logs and policies, firewall policies, a security or access log, print or other reporting files, as well as others.

Figure 2:
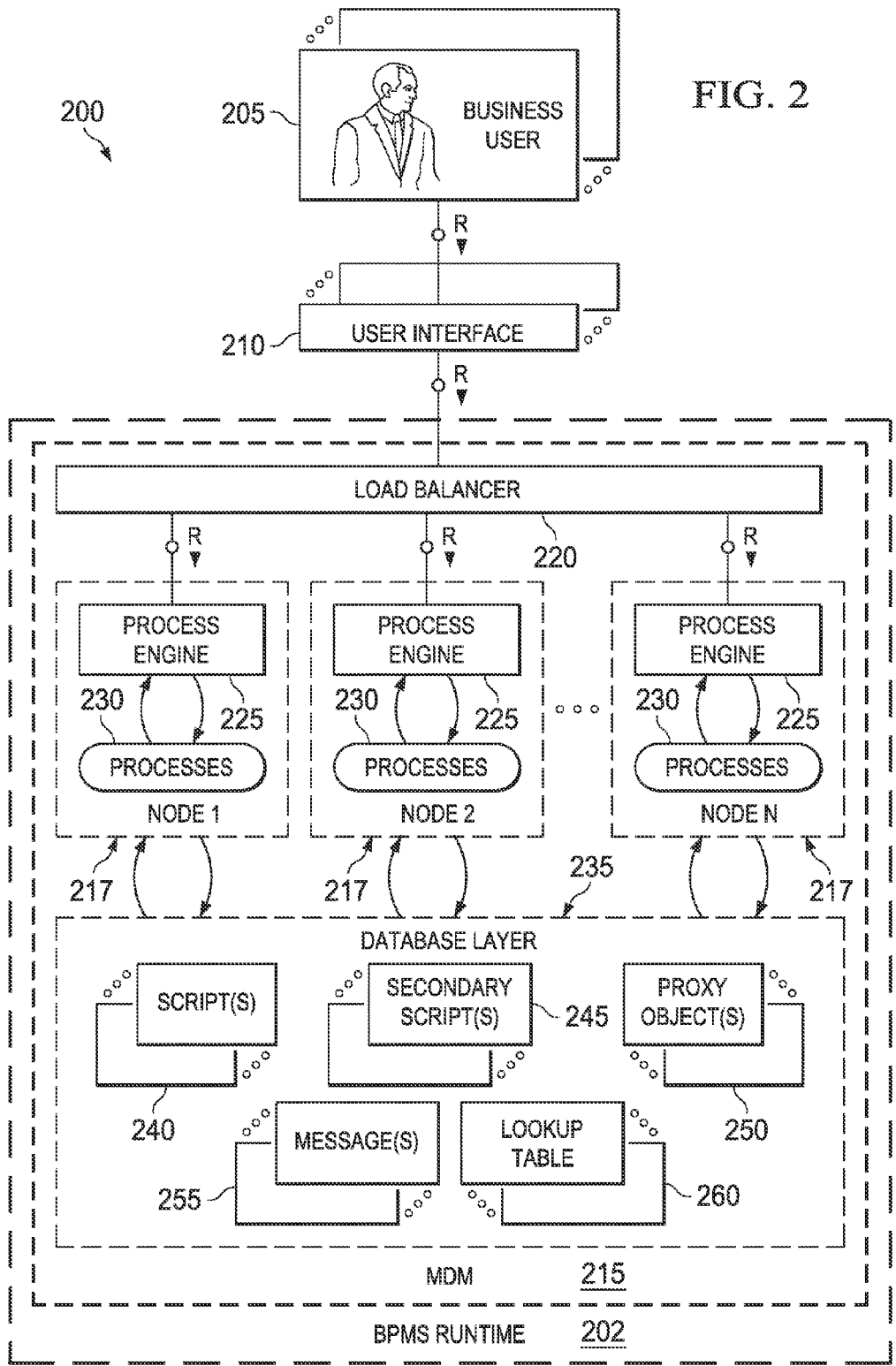
FIG. 2 illustrates an example architecture of a distributed BPMS runtime that includes a BPMS runtime with a message delivery middleware.

In some embodiments, and as described more fully with reference to FIG. 2, the memory 135 may store and/or reference one or more business process messages received by the on-premise computing system 104. Additionally, the memory 135 may store or reference one or more scripts that include, for example, a payload of the one or more business process messages. In addition, in some embodiments, the memory 135 may store or reference one or more secondary scripts, which may also include, for example, the payload of the one or more business process messages. In addition, in some embodiments, the memory 135 may store or reference one or more database tables that include descriptions of one or more business processes being executing, that have been executed, and/or that will be executed on one or more nodes of the on-premise computing system 105.

Each of the illustrated clients 115 and/or 117 may be any computing device operable to connect to or communicate with at least the on-demand computing system 110 and on-premise computing system 105 and/or via the network 120 using a wireline or wireless connection. As illustrated, for example, the clients 117 may be nodes of the on-premise computing system 105 while the clients 115 may be external clients (e.g., not nodes) of the on-premise computing system 105. Alternatively, each of the clients 115 and 117 may be considered as nodes to the on-premise computing system 105 and/or the on-demand computing system 110. Further, each illustrated client typically includes a processor, an interface, a graphical user interface (GUI), a client application, and a memory. In general, each illustrated client comprises an electronic computer device operable to receive, transmit, process, and store any appropriate data associated with the system 100 of FIG. 1.

There may be any number of clients associated with, or external to, system 100. For example, while illustrated system 100 includes clients 115 and clients 117, alternative implementations of system 100 may include a single client communicably coupled to the on-demand computing system 110 and on-premise computing system 105, or any other number suitable to the purposes of the system 100. Additionally, there may also be one or more additional clients external to the illustrated portion of system 100 that are capable of interacting with the system 100 via the network 120. Further, the term "client" and "user" may be used interchangeably as appropriate without departing from the scope of this disclosure. Moreover, while each client is described in terms of being used by a single user, this disclosure contemplates that many users may use one computer, or that one user may use multiple computers.

As used in this disclosure, "client" or "node" is intended to encompass a personal computer, touch screen terminal, workstation, network computer, kiosk, wireless data port, smart phone, personal data assistant (PDA), one or more processors within these or other devices, or any other suitable processing device. For example, each client may comprise a computer that includes an input device, such as a keypad, touch screen, mouse, or other device that can accept user information, and an output device that conveys information associated with the operation of the on-demand computing system 110 and the on-premise computing system 105 (and BPMS runtime 145) or the client itself, including digital data, visual information, the client application, or the GUI. Both the input and output device may include fixed or removable storage media such as a magnetic storage media, CD-ROM, or other suitable media to both receive input from and provide output to users of the clients through the display, namely, the GUI.

A GUI typically comprises a graphical user interface operable to interface with at least a portion of system 100 for any suitable purpose, including generating a visual representation of client application (in some instances, the client's web browser) and the interactions with the BPMS runtime 145 and MDM 150, including the responses received from the BPMS runtime 145 and MDM 150 in response to the requests sent by a client application. Generally, through the GUI, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI can represent any graphical user interface, including but not limited to, a web browser, touch screen, or command line interface (CLI) that processes information in system 100 and efficiently presents the information results to the user.

In general, a GUI may include multiple user interface (UI) elements, some or all associated with a client application or the BPMS runtime 145 and MDM 150, such as interactive fields, pull-down lists, and buttons operable by the user at a particular client. These and other UI elements may be related to or represent the functions of the client application, as well as other software applications executable from a particular illustrated client. For purposes of the present location, a GUI may be a part of or the entirety of a client application, while also merely a tool for displaying the visual representation of application actions and interactions.

FIG. 2 illustrates an example architecture 200 including a distributed BPMS runtime 202 with a message delivery middleware 215. Generally, architecture 200 may represent an enterprise-level distributed deployment of a BPMS runtime 202 that, in some embodiments, may handle multiple (e.g., thousands per day) concurrent process instances ("processes") 230 that are implemented by one or more process engines 225 on the nodes 217. In some embodiments, a particular process 230 or processes 230 may be implemented over time by multiple nodes 217. At a particular time instant, however, a particular process 230 or processes 230 may be located at exactly one node 217. For instance, the particular process 230 may begin its implementation on a particular node 217 and finish its implementation on another node 217.

The architecture 200 may represent a scalable architecture, for example a horizontally scalable architecture that includes a distributed software system (e.g., the BPMS runtime 202) across several computing nodes 217. Each computing node 217 may be one of several computing appliances that is part of a "cluster." In some embodiments, architecture 200 may also be vertically scalable, in that each cluster and/or computing node 217 may be improvable (e.g., by adding more and better hardware to one or more computing appliances).

The illustrated architecture 200 includes one or more business users 205 communicably coupled to one or more user interfaces 210. As illustrated, the one or more user interfaces are communicably coupled to a load balancer 220 of the BPMS runtime 202. In some embodiments, the load balancer 220 may, for example, facilitate direction of a request from the business user 205 to an already running process 230 on a particular node 217. Alternatively, in some instances, the load balancer 220 may direct the request to an arbitrary node 217 if the request is not directed at an already running process 230.

If the request is meant to be served by an existing process 230 (e.g., a shipping request for an order-to-cash process identified through a sales order ID), the load balancer 230 may, for example, determine the node 217 on which the target process 230 is currently running and deliver the request to that particular node 217. As another example, the load balancer 230 may not assume responsibility of the request but merely delivers the request to any node 217 (e.g., an idle node), and the target process 230 may be relocated to the node 217 to which the request was delivered in case the process 230 is not already present. Relocation of processes 230 to nodes 217 on which they are not currently running, however, may not be desirable in all instances. Thus, the MDM 215 may implement a scheme in which target processes 230 are not relocated, but execute on the initial node 217 (or nodes 217) on which the process 230 began.

In some embodiments, the load balancer 230 (or another component of the system 200, such as the MDM 215), may identify a particular process 230, or may determine that there is no process 230 associated with a request, through correlation. In some embodiments, correlation may involve, for instance, analyzing a payload of the request (e.g., a message) and matching it to a particular state of each running process 230. Correlation may not be used to match a request to a single process only. For instance, in some embodiments, a request may be matched to many processes 230 (e.g., broadcast). As another example, the request may be matched to an existing process 230 but, if no matching process 230 exists, a new process 230 may be created (e.g., a conditional start). As yet another example, several subsequent requests may be matched to a process 230 (e.g., collect scenarios and conversational processes).

Continuing the above example, for instance, the payload of the request (e.g., message) may be a sales order ID, which may be matched to a context of an order-to-cash process. Once the request is delivered to the particular node 217, it may be executed by the process engine 225 that also executed the business process 230 to which the message was correlated.

As illustrated, the architecture 200 includes the MDM 215. The MDM 215 may include a database layer 235. The illustrated database layer 235, as shown, stores one or more primary scripts 240 that, in some embodiments, are arranged in a queue. The database layer 235 may also store one or more secondary scripts 245, one or more proxy objects 250, and one or more messages 255 (e.g., requests).

In some embodiments, the MDM 215 may be messaging service provider, such as, for example, a Java Message Service (JMS) API for sending messages (e.g., requests) between two or more nodes 217 (node 1 through node n), for example, clients. The MDM 215 may provide for robust message queuing and subscriptions based on message attributes. In particular, the MDM 215 may take into account that a process 230 may move between different nodes 217 and, therefore, may not be "pinned" to a single node 217 for its entire execution. Messages that are to be dispatched to a process 230 may not, therefore, target a specific node 217. Alternatively, the MDM 215 may support processes 230 that move between nodes 217 and may dynamically establish and withdraw subscriptions to messages for a particular process 230.

In operation, the architecture 200 may implement a process by which messages 255 are received and routed to one or more particular nodes 217 within the architecture to ensure that the messages 250 adhere to a correlation condition, which compares the message payload to the process context of the executing processes 230. Such a process may also ensure that any particular message 250 may either not be received by any process 230, be routed to a single process 230, or be broadcast to multiple processes 230. In some embodiments, the MDM 215 may, along with other components of the architecture 200, implement such a process.

Figure 3:
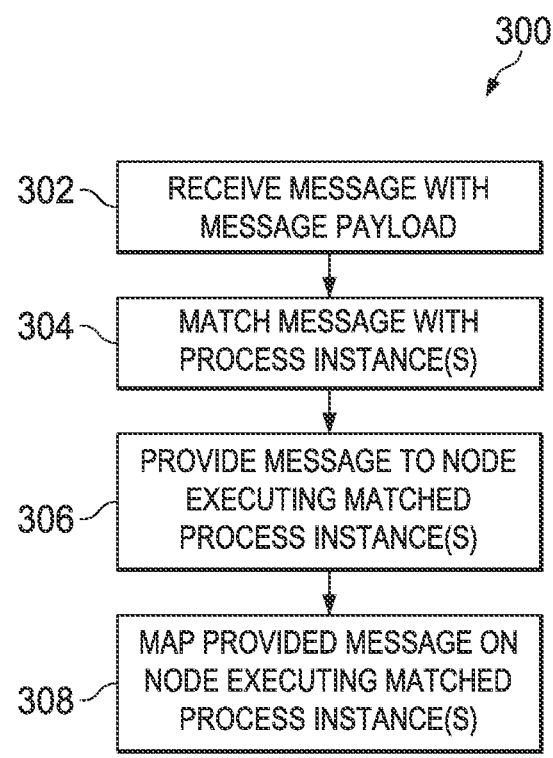
FIG. 3 illustrates an example process implemented with a message delivery middleware of a BPMS runtime.

FIG. 3 illustrates an example, high level, method 300 implemented with the architecture 200, including the MDM 215. In some implementations, method 300 may illustrate a graphical and technical description of how message processing occurs in the context of a process management suite executing business processes. Method 300 may begin at step 302, when a message (e.g., a request) that include a message payload is received at the MDM 215. In some embodiments, for instance, the message may be received from the business user 205 in the architecture 200, or, for example, another client or node of the architecture 200.

In step 304, the received message may be matched, for instance by the MDM 215 (or a component of the MDM 215) to one or more processes. For example, when another component (e.g., client, node) sends a message to the BPMS runtime 202, it may do so in an open transaction (e.g., WS-ReliableMessaging). Within that transaction, the BPMS runtime 202 and/or MDM 215 may determine the matching process instances, e.g., the list of processes whose correlation condition holds true for that received message.

In some embodiments, this matching is backed by a database lookup where all process instances are stored (and updated). For example, a lookup table 260 stored in the database layer 235 may store the relevant portions of the context of the process instances (i.e., the processes 230) to facilitate matching. In some embodiments, the step 304 of matching may occur without, possibly, having the receiving process instance locally available on a particular node 217.

In some embodiments, the matched process instance is not transported between nodes 217. Instead, one or more process proxy objects 250 are generated once a process instance is matched to the received message. Each process proxy object 250 may provide access to the process identity (e.g., the particular process that is matched). Each process proxy object 250 may also, at least help determine whether the process instance 230 is locally available (e.g., on the particular node 217 at which the message was received).

In step 306, the received message is provided to a particular node 217 in the architecture 200 in which the matched process is executing. For example, the process proxy object 250 may determine whether the matched process instance is locally available (e.g., on the same node 217 as the received message) or not locally available (e.g., on one or more other nodes 217). If the matched process is not locally available, in some embodiments, the MDM 215 may publish a script 240 that includes the payload of the matched message to a queue on the database layer 235 (e.g., available to each of the nodes 217).

In step 308, the received message that is matched to the process instance is mapped on the node 217 executing the matched process. For example, the message payload may be mapped to the process context. The process instance, if "blocked" or "locked" on the particular node 217 (e.g., awaiting a message) may be un-blocked or un-locked on that node 217. In some instances, message matching and message receipt may happen asynchronously. For instance, a message may be sent before a matching process is actually ready to receive that message (e.g., because it may not yet have reached the receive step). The message, however, must not be discarded in order to not violate the "exactly once" criterion.

Figure 4:
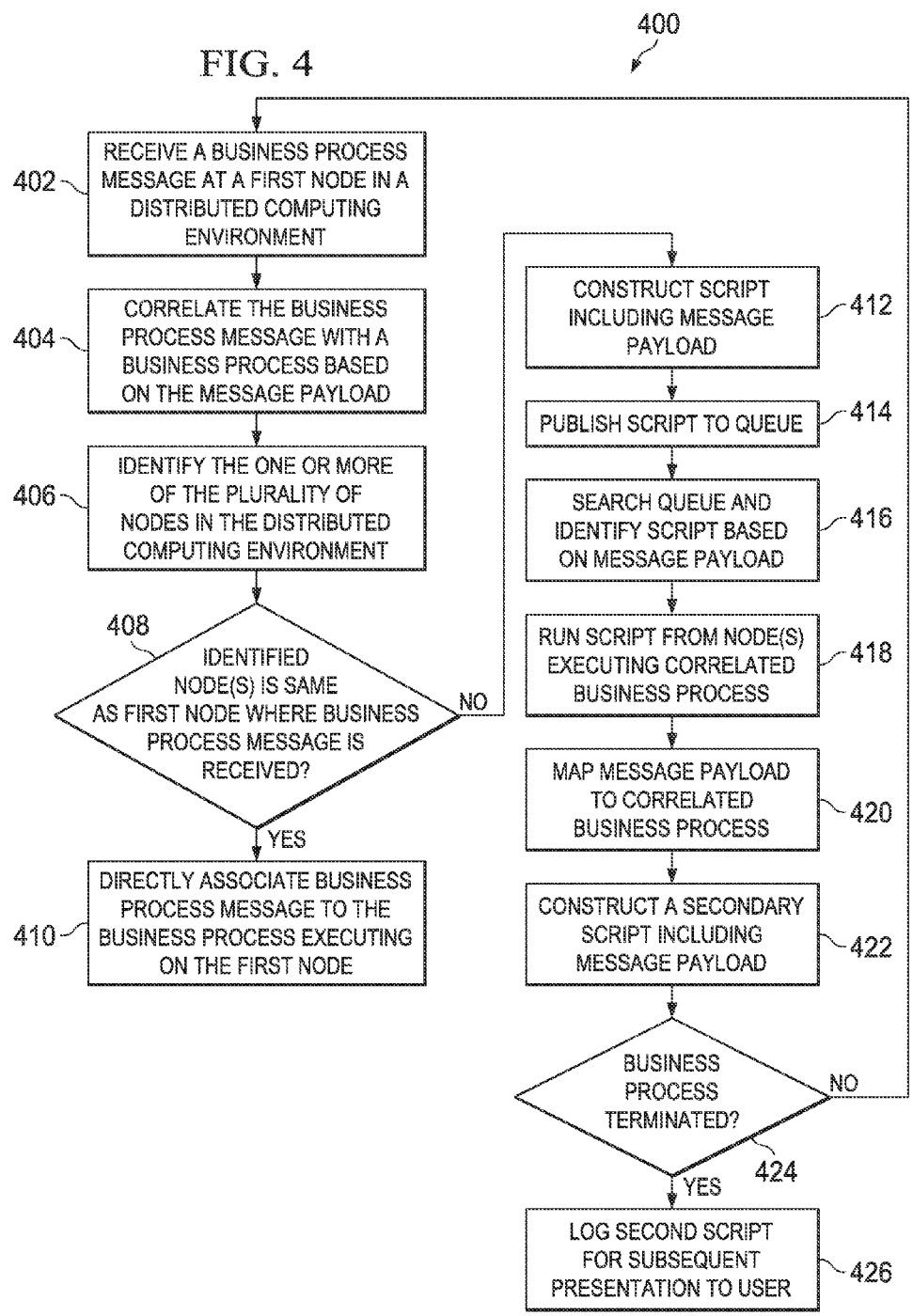
FIG. 4 illustrates another example process implemented with a message delivery middleware of a BPMS runtime.

FIG. 4 illustrates another example method implemented with a MDM of a BPMS runtime, such as the MDM 215 of the BPMS runtime 202 illustrated in FIG. 2.

In step 402, a business process message is received at a first node (e.g., a client or other computing device) in a distributed computing environment. In some embodiments, the business process message may affect one or more business processes executing in the distributed computing environment.

In step 404, the business process message is correlated with a business process based on the message payload. For example, the business process message may include a payload of data that identifies (all or partially) a particular one or more business processes executing in the distributed computing environment, e.g., by the context of the business process.

In step 406, one or more of the plurality of nodes in the distributed computing environment are identified, for instance, based on one or more of the business processes executing on the nodes. In step 408, a determination is made whether the identified node(s) is the same as the first node at which the business process message is received. If so, then the business process message is provided (e.g., directly associated) to the business process executing on the first node in step 410. In such instances, since the business process message and correlated business process reside on the same node, the business process message may simply be directly associated with the correlated process.

In some embodiments, providing the business process message to the business process executing on the first node includes creating one or more process proxy objects associated with the business process that was previously correlated. Then, a matching business process message is created for each one of the proxy objects. The matching business process messages are then provided to the nodes of the distributed computing system (rather than, for instance, moving the correlated business process to the node on which the business process message was received).

In step 410, if it is determined that the identified node(s) is not the same as the first node at which the business process message is received, then a script including the message payload is created at step 410.

In step 412, the script is published to a queue in a database or other memory module that is communicably coupled to the nodes in the distributed computing environment. For example, in some embodiments, in a distributed computing environment (e.g., a cluster/cloud based infrastructure), processes that may receive messages may be dispersed across multiple BPMS runtime nodes (e.g., physically or virtually separated instances of a BPMS runtime) such that an event (e.g., delivery of a message) often needs to be transported to another node (e.g., the node where the receiving process instance currently resides). An event, although described as a message, for example, may be a complex sequence of actions that need to be performed in the context of the receiving process. In the case of message receipt, that may entail creating a copy of the message's correlation keys (e.g., to later determine the validity of a correlation condition), and copying or retaining the message payload (e.g., an XML document).

In other embodiments, even more complex actions may be performed remotely. Besides comprising multiple actions, those actions may only be dynamically determined at runtime. For instance, it may depend on the message's payload size whether it is copied or merely retained. Consequently, such embodiments may employ dynamically assembled scripts that allow for parameterizing the to-be-performed actions at runtime.

In step 414, the script is published to a queue that is stored and accessible to the nodes in the distributed computing environment. In step 416, the queue may be searched (e.g., by a process implemented (e.g., periodically) on the node(s) on which the correlated business process is executed, or, in some embodiments, by each node in the environment.

In some embodiments, between enqueuing the script and delivery of the script, the "topology" of the distributed computing environment may change such that additional nodes join or nodes drop from the environment. In some cases, a process instance may be re-located to another node for load-balancing reasons or because it was explicitly requested to do so (e.g., in response to some administrative action). Thus, any script routing mechanism may not assume a fixed location for a script but should rather refrain from using physical addresses when enqueuing a script.

For example, in some embodiments, a logical routing approach is employed where the script is complemented with an "anchor object reference," which refers to an object (e.g., a status variable) that is part of the target process instance, i.e., the correlated process. The anchor object reference may be used to locally (i.e., on a specific node) determine whether or not the corresponding process instance is currently located on that node. For instance, a polling mechanism may be employed where all (or substantially all) nodes in a distributed environment periodically (e.g., every minute) query the queue for scripts that target one or more process instances being hosted on that node. Any node can consistently determine whether or not it currently hosts a process instance by registering to the process' creation/destruction and caching (e.g., eviction, recovery) callbacks.

In some embodiments, when a process instance is locally created or recovered from the underlying database, the respective node may recognize that event and acquire an exclusive lock from a central locking provider. That lock may be held by that particular node for as long as the process instance is neither terminated nor evicted. When polling scripts from the database, nodes can simply probe for the corresponding locks and only if granted (or already held), dequeue a script and deliver it to a locally hosted process instance. This may also include handling evicted processes (i.e., the default state for process instances that are currently idle) for which no node holds a lock. At the time when a script for an evicted process instance arrives, the first node to successfully acquire the lock may also recover that process instance and dequeue the script as described before.

Continuing with method 430, in step 418, the dequeued script is run from the particular node(s) on which the target process instance is executing. In step 420, the message payload from the script is mapped to the target process instance.

In step 422, in some embodiments of method 400, a secondary script including message payload may be constructed and a determination may be made whether the target business process is terminated in step 424. For example, between sending a script and receiving that script in the context of some process instance, the receiving process may terminate. Thus, a script may fail to be successfully run on the node executing the target process instance. In some embodiments, a proper failover handling may be necessary. For example, a message correlation use-case may, in particular, require an alternative treatment of "dangling" scripts to make sure not to lose any messages. That is, processes may be configured to support a "collect" scenario where a stream of messages is picked up by a single process instance at a time. At some point, that process instance may stop further collecting messages (e.g., when a certain number of messages was received or after some time has passed) and require a successor process instance to "kick in" and continue receiving successor messages. The "collect" scenario is essential for system-centric processes and requires an "exactly once" treatment of incoming messages (i.e., no message loss, no duplicate receipt).

As another example of dangling script handling procedures, an error may be raised (e.g., when a sending component/system strictly relies on having a receiving process instance still available when the message is to be delivered). As another example, in step 424, if it is determined that the business process is terminated (or some other dangling script situation has occurred), the second script is logged for subsequent presentation to a user. For instance, logging the scripts that have failed to reach their target process (for monitoring purposes) may allow a user to be notified of such failures.

A number of implementations have been described. Nevertheless, it will be understood that various modifications can be made. For example, other methods described herein besides those, or in addition to those, illustrated in FIGS. 3 and 4 can be performed. Further, the illustrated steps of methods 300 and 400 can be performed in different orders, either concurrently or serially. Further, steps can be performed in addition to those illustrated in methods 300 and 400, and some steps illustrated in methods 300 and 400 can be omitted without deviating from the present disclosure. Accordingly, other implementations are within the scope of the following claims.

What is claimed is:

1. A method performed with a distributed computing system for managing business process messaging, the method comprising:
receiving a business process message at a first node of a plurality of nodes in a distributed computing environment, the business process message comprising a message payload;
correlating the business process message with a business process executing on one or more of the plurality of nodes in the distributed computing environment based on the message payload;
identifying the one or more of the plurality of nodes in the distributed computing environment, the identification comprising:
determining that the business process is executing on one or more nodes other than the first node in the plurality of nodes;
constructing a script comprising the message payload; and
publishing the script to a queue available to the plurality of nodes;
providing the business process message to the identified one or more of the plurality of nodes by running, on the one or more nodes other than the first node in the plurality of nodes, the script from the queue; and
subsequent to running the script, mapping the message payload to the business process executing on the identified one or more of the plurality of nodes other than the first node.

2. The method of claim 1, wherein providing the business process message and mapping the message payload occur asynchronously.

3. The method of claim 1, wherein identifying the one or more of the plurality of nodes in the distributed computing environment comprises:
identifying one node of the plurality of nodes in the distributed computing environment on which the business process is executing; and
determining that the identified one node and the first node are the same node.

4. The method of claim 3, wherein providing the business process message to the identified one or more of the plurality of nodes comprises:
directly associating the business process message to the business process executing on the identified one node.

5. The method of claim 1, further comprising:
constructing a second script comprising the message payload;
determining that the business process has terminated prior to mapping the message payload to the business process executing on the identified one or more of the plurality of nodes;
based on the determination, logging the second script for subsequent presentation to a user.

6. The method of claim 1, wherein providing the business process message to the identified one or more of the plurality of nodes comprises:
creating one or more proxy objects associated with the business process executing on one or more of the plurality of nodes;
creating a matching business process message for each of the one or more proxy objects; and
providing the matching business process message to the one or more of the plurality of nodes.

7. A non-transitory computer storage medium encoded with a computer program, the program comprising instructions that when executed by one or more computers cause the one or more computers to perform operations comprising:
receiving a business process message at a first node of a plurality of nodes in a distributed computing environment, the business process message comprising a message payload;
correlating the business process message with a business process executing on one or more of the plurality of nodes in the distributed computing environment based on the message payload;
identifying the one or more of the plurality of nodes in the distributed computing environment, the identification comprising:
determining that the business process is executing on one or more nodes other than the first node in the plurality of nodes;
constructing a script comprising the message payload; and publishing the script to a queue available to the plurality of nodes;

providing the business process message to the identified one or more of the plurality of nodes by running, on the one or more nodes other than the first node in the plurality of nodes, the script from the queue; and subsequent to running the script, mapping the message payload to the business process executing on the identified one or more of the plurality of nodes other than the first node.

8. The non-transitory computer storage medium of claim 7, wherein providing the business process message and mapping the message payload occur asynchronously.

9. The non-transitory computer storage medium of claim 7, wherein identifying the one or more of the plurality of nodes in the distributed computing environment comprises:

identifying one node of the plurality of nodes in the distributed computing environment on which the business process is executing; and determining that the identified one node and the first node are the same node.

10. The non-transitory computer storage medium of claim 9, wherein providing the business process message to the identified one or more of the plurality of nodes comprises:

directly associating the business process message to the business process executing on the identified one node.

11. The non-transitory computer storage medium of claim 7, wherein the operations further comprise:

constructing a second script comprising the message payload;

determining that the business process has terminated prior to mapping the message payload to the business process executing on the identified one or more of the plurality of nodes;

based on the determination, logging the second script for subsequent presentation to a user.

12. The non-transitory computer storage medium of claim 7, wherein providing the business process message to the identified one or more of the plurality of nodes comprises:

creating one or more proxy objects associated with the business process executing on one or more of the plurality of nodes;

creating a matching business process message for each of the one or more proxy objects; and providing the matching business process message to the one or more of the plurality of nodes.

13. A system of one or more computers configured to perform operations comprising:

receiving a business process message at a first node of a plurality of nodes in a distributed computing environment, the business process message comprising a message payload;

correlating the business process message with a business process executing on one or more of the plurality of nodes in the distributed computing environment based on the message payload;

identifying the one or more of the plurality of nodes in the distributed computing environment, the identification comprising:

determining that the business process is executing on one or more nodes other than the first node in the plurality of nodes;

constructing a script comprising the message payload; and publishing the script to a queue available to the plurality of nodes;

providing the business process message to the identified one or more of the plurality of nodes by running, on the one or more nodes other than the first node in the plurality of nodes, the script from the queue; and subsequent to running the script, mapping the message payload to the business process executing on the identified one or more of the plurality of nodes other than the first node.

14. The system of claim 13, wherein providing the business process message and mapping the message payload occur asynchronously.

15. The system of claim 13, wherein identifying the one or more of the plurality of nodes in the distributed computing environment comprises:

identifying one node of the plurality of nodes in the distributed computing environment on which the business process is executing; and determining that the identified one node and the first node are the same node.

16. The system of claim 15, wherein providing the business process message to the identified one or more of the plurality of nodes comprises:

directly associating the business process message to the business process executing on the identified one node.

17. The system of claim 13, wherein the operations further comprise:

constructing a second script comprising the message payload;

determining that the business process has terminated prior to mapping the message payload to the business process executing on the identified one or more of the plurality of nodes;

based on the determination, logging the second script for subsequent presentation to a user.

18. The system of claim 13, wherein providing the business process message to the identified one or more of the plurality of nodes comprises:

creating one or more proxy objects associated with the business process executing on one or more of the plurality of nodes;

creating a matching business process message for each of the one or more proxy objects; and providing the matching business process message to the one or more of the plurality of nodes.

* * * * *